United States Patent [19]
Watanabe

[11] 3,891,912
[45] June 24, 1975

[54] AUTOMATIC PULSE PHASE SHIFTER FOR A.C.-D.C. OR D.C.-A.C. CONVERTER

[75] Inventor: Atsumi Watanabe, Hitachi, Japan
[73] Assignee: Hitachi, Ltd., Japan
[22] Filed: Dec. 21, 1973
[21] Appl. No.: 427,150

[30] Foreign Application Priority Data
Dec. 25, 1972 Japan............................ 47-129412

[52] U.S. Cl.................................. 321/16; 321/40
[51] Int. Cl. ........................................... H02m 1/08
[58] Field of Search ............... 321/5, 16, 18, 38, 40, 321/47

[56] References Cited
UNITED STATES PATENTS
| | | | |
|---|---|---|---|
| 3,474,321 | 10/1969 | Ainsworth........................... | 321/38 |
| 3,648,148 | 3/1972 | Bechet et al........................ | 321/40 |
| 3,683,261 | 8/1972 | Holtz.................................. | 321/40 |
| 3,766,465 | 10/1973 | Reeve................................. | 321/18 |

OTHER PUBLICATIONS
(S0106 0002) Ekstrom et al., "A Refined HVDC Control System," IEEE Transactions on Power Apparatus and Systems, Vol. PAS-89, No. 516, (May/June 1970), pp. 723-732.

Galanos et al., "Direct Digital Control of HVDC Converters," IEEE Transactions on Power Apparatus and Systems, Vol. PAS-89, No. 8, (Nov./Dec. 1970) pp. 2056-2065.

Primary Examiner—William H. Beha, Jr.
Attorney, Agent, or Firm—Craig & Antonelli

[57] ABSTRACT

An automatic pulse phase shifter in which a voltage-controlled oscillator having a fundamental frequency six times the frequency of a synchronous power supply of a converter, such as a rectifier and an inverter, is used to produce pulses with precise 60° intervals independent of the phase displacement or frequency variations due to voltage variations or disturbances in the synchronous power supply, which pulses are phase-shifted in accordance with a predetermined control signal.

5 Claims, 9 Drawing Figures

AUTOMATIC PULSE PHASE SHIFTER FOR A.C.-D.C. OR D.C.-A.C. CONVERTER

The present invention relates to an automatic pulse phase shifter for determining the firing phase of thyristors or grid-controlled mercury arc valves of a convertor by means of a controlled rectifier (hereinafter referred to as a "thyristor").

The convertor is so controlled that thyristors are turned on and off at a predetermined phase and therefore it necessarily produces higher harmonics. These harmonics must be eliminated by connecting a filter on the AC side of the convertor. Especially, the elimination of higher harmonics is vital for the large-capacity convertor such as used for DC transmission. As far as the convertor is operated under predetermined conditions, frequencies and amplitudes of the higher harmonics produced by the convertor can be determined beforehand and therefore a filter suitable for elimination of the particular harmonics may be provided. However, in an abnormal condition such as when the convertor operates under an unbalanced AC power supply, the generation of unexpected higher harmonics makes it difficult to eliminate them with the existing filter. In spite of this, it is uneconomical to provide an additional filter capable of elimination of all such higher harmonics.

It is therefore desirable to control the convertor in such a manner as not to generate any different higher harmonics even in an unexpected operating condition.

One practicable method for preventing the occurrence of such unprescribed higher harmonics is to maintain the regular intervals of the firing pulses applied to the convertor. A method disclosed in the past to achieve this purpose provides firing pulses by dividing the output frequency of a voltage-controlled oscillator the fundamental frequency of which is a predetermined multiple of the frequency of the AC power supply. In such a method, the phase-shifting of the firing pulses for controlling the phase thereof is accomplished by changing the oscillation frequency by controlling the voltage applied to the oscillator. For example, a paper under the title of "The Phase-locked Oscillator - A New Control System for Controlled Static Convertors" in IEEE, PAs, March '68, P.859 to 865, reports a method in which a 6-pulse bridge convertor circuit is controlled by a voltage-controlled oscillator and a ring counter, in such a manner that the phase of firing pulses is changed by changing the oscillation frequency of the voltage-controlled oscillator. The disadvantage of the cited method is the difficulty to change the phase of firing pulses sharply and hence the lack of high responsiveness due to the fact that any attempt to quickly control the convertors places the circuits out of synchronism.

Accordingly, it is an object of the present invention to provide an automatic pulse phase shifter using a voltage-controlled oscillator highly responsive to the control operation for maintaining accurately regular intervals of the firing pulses.

Another object of the invention is to provide an automatic pulse phase shifter in which the pulse phase shifting section for phase control of firing pulses is entirely "digitized".

Still another object of the invention is to provide an automatic pulse phase shifter in which a pulse phase displacement due to noises is prevented.

In order to achieve the above-mentioned purposes, the present invention is characterized in that the voltage-controlled oscillator is provided for the sole purpose of securing intervals between pulses, while on the other hand the phase-shifting of the pulses for control of the firing phase is accomplished by the phase-shifting section independently of the oscillator. Also, taking into consideration the fact that outputs of the oscillator may be used in the form of pulses, they are applied to a counter and the amount of phase shifting is detected digitally thereby to entirely digitize the pulse phase shifting section.

The above and other objects, features and advantages will be made apparent by the detailed description taken in conjunction with the accompanying drawings, in which.

Prior to the detailed description of the invention which will be made later, the necessity for the present invention will be explained with reference to FIGS. 1 to 3.

Figure 1:
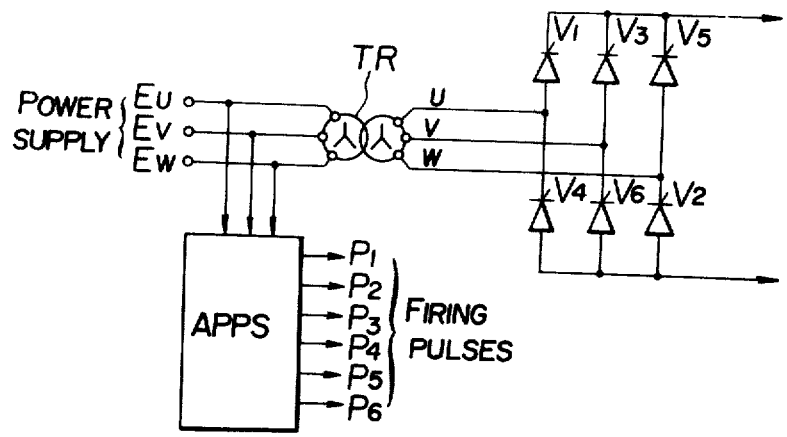
FIG. 1 is a diagram showing the construction of a thyristor bridge.

In FIG. 1 showing a typical 3-phase full-wave thyristor bridge, reference symbols Eu, Ev and Ew show a 3-phase power supply, symbol TR a transformer, and $V_1$ to $V_6$ a thyristor arm bridge making up the 3-phase full-wave bridge. Symbol APPS shows an automatic phase shifter which receives inputs Eu, Ev and Ew and produces output pulses $P_1$ to $P_6$ in predetermined phase relationship with the inputs Eu, Ev and Ew thereby to fire the arms $V_1$ to $V_6$ respectively.

Figure 2:
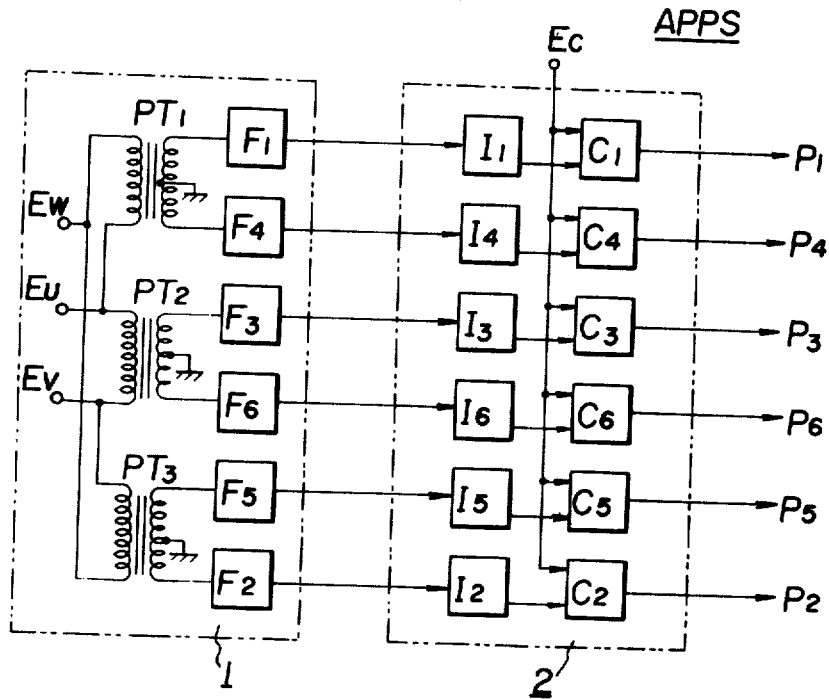
FIG. 2 shows an example of the conventional phase shifter.
Figure 3:
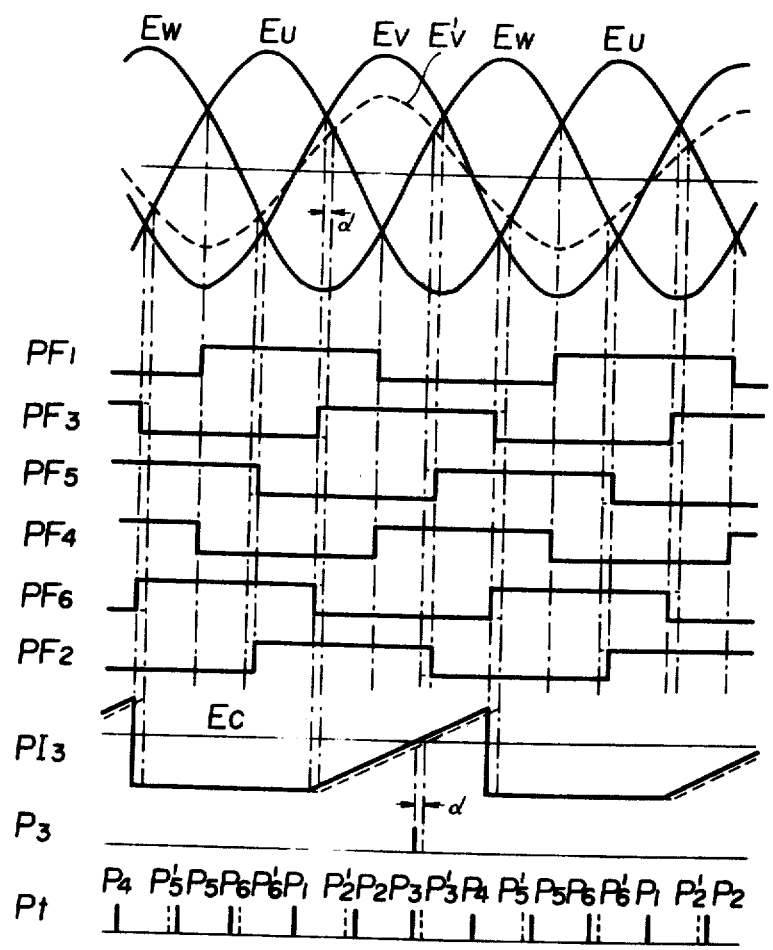
FIG. 3 is a diagram for explaining the operation of the phase shifter of FIG. 2.

APPS generally comprises a circuit as shown in FIG. 2. In this drawing, reference symbols $PT_1$, $PT_2$ and $PT_3$ show voltage transformers, symbols $F_1$ to $F_6$ a waveform convertor circuits for converting a sine wave into a rectangular wave, symbols $I_1$ to $I_6$ integrating circuits, symbols $C_1$ to $C_6$ comparators and symbol $E_c$ control voltage. For convenience of illustration, the portions surrounded by dashed lines with reference numerals 1 and 2 will be referred to as the synchronous power supply and the pulse phase shifting section respectively.

The principle on which the firing pulse $P_3$ for the arm $V_3$ of the thyristor bridge is generated will be explained with reference to the wave-forms shown by solid lines representing the outputs of the component elements of the circuit of FIG. 2. The line voltage between phases u and v is applied to the voltage transformer $PT_2$, so that the output $PF_3$ of the waveform convertor circuit $F_3$ as shown in FIG. 3 is produced. This output is applied to the integrating circuit $I_3$ thereby to produce the waveform $PI_3$. The comparator $C_3$ produces a pulse at the time when $PI_3$ becomes equal to the control voltage Ec, and therefore the firing pulse $P_3$ is obtained for the thyristor $V_3$ at point $P_3$. As shown in FIG. 3 by the solid lines representing a pulse train Pt, pulses $P_1$ to $P_6$ are generated at exactly 60° when the AC power supply is balanced. However, in a hypothetical case where the AC power supply becomes so unbalanced that voltage Ev of phase V drops to Ev' as shown by a dashed line in FIG. 3, the waveforms dependent thereon are produced as indicated by the dashed lines, with the result that the phases of the firing pulse $P_3$ of the arm $V_3$ is delayed by $\alpha$. In like manner, the phases of the other firing pulses are also changed, and as a result the pulse intervals become irregular as shown, the phases of pulses $P_1$ and $P_4$ under-going no change.

In the balanced state of the three phases, it is the 5th, 7th, 11th, 13th, ... ($6n \pm 1$) the harmonics that are theoretically generated in the convertor, while the other harmonics including the 3rd, 9th harmonics and so on are not generated. In such a convertor, therefore, it is commonly believed that if suffices if a bypass filter is provided on the AC side of the transformer to absorb the higher harmonics. In the case of 3-phase unbalance as shown by the dashed lines on FIG. 3, however, the 3rd, 9th harmonics and so on are additionally generated, resulting in the waveform of the power supply being distorted. Especially when a large impedance of the power supply is involved, the convertor becomes inoperative because of the distorted waveform.

The present invention which obviates the above-mentioned disadvantages will be explained below. A voltage-controlled oscillator similar to the one used in the cited conventional device is employed as the synchronous power supply 1 thereby to produce a reference voltage with exactly regular cycles, while on the other hand an arrangement is made to control firing pulses by the pulse phase shifting section 2 entirely independently of the oscillator. In this way, the automatic pulse phase shifter according to the invention is capable of immediate response to the control operation while at the same time securing the intervals of the firing pulses accurately.

Figure 4:
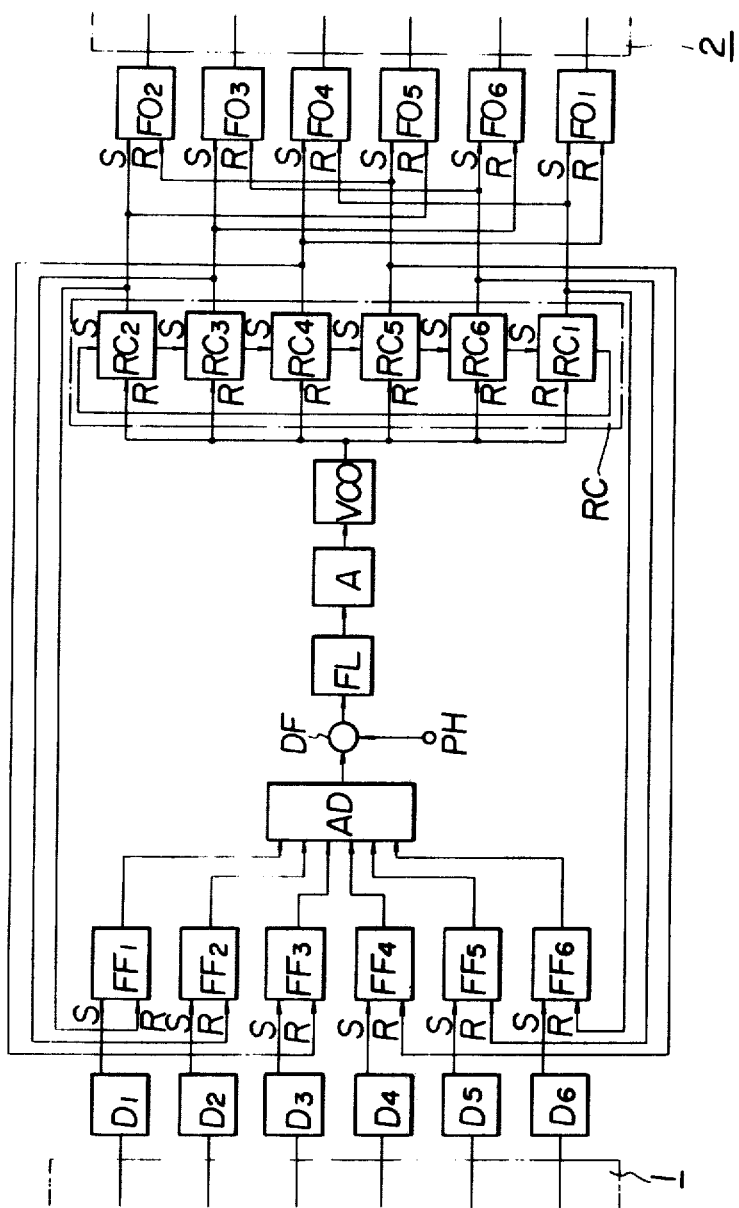
FIG. 4 is a diagram showing an embodiment of the present invention.

According to the present invention, as shown in FIG. 4, a rectangular wave to which the wave, from the synchronous AC power supply is converted, is applied not directly to the pulse phase shifter. But the output frequency of a phase-locked oscillator which operates in synchronism with the synchronous power supply and has a frequency equivalent to a predetermined multiple of the frequency of the power supply is divided by a predetermined divisor through a ring counter applied as a synchronizing input to the pulse phase shifting section 2 shown in FIG. 2. Like the prior art circuit shown in FIG. 2, the output pulse phase is highly responsive to the control voltage Ec on one hand, and the pulse intervals are fixed as they are determined only by voltage-controlled oscillator. In this case, the phase-locked oscillator which is placed in fixed phase relationship between voltage-controlled oscillator and the AC power supply has only to follow the slow variations of the frequency of the power supply, and therefore, the synchronism maintained therebetween is not lost.

The present invention as it is applied to the 6-pulse bridge convertor will be explained with reference to an embodiment shown in FIG. 4. The circuit portions shown in FIG. 4 are inserted between the synchronous power supply 1 and the pulse phase shifting section 2 of FIG. 2. In the drawing, through the leading wires connected on both sides, the outputs of wavefrom convertor circuits $F_1$ to $F_6$ of FIG. 2 are applied to differentiation circuits $D_1$ to $D_6$ of FIG. 4 respectively, while the outputs of $FO_1$ to $FO_6$ of FIG. 4 are applied to the integrating circuits $I_1$ to $I_6$ of FIG. 2 respectively. Only the positive pulse outputs of the differentiation circuits $D_1$ to $D_6$ are introduced to the set terminals of flip-flops $FF_1$ to $FF_6$ in the next stage thereby to set the same. These flip-flops are reset upon application to the reset terminals R of outputs from the flip-flops $RC_2$, $RC_3$ .. . $RC_6$, $RC_1$ which comprise a ring counter RC as described later. The width or time duration of the outputs of the six flip-flops $FF_1$ to $FF_6$ or the magnitude of corresponding voltages represents the phase difference between the synchronous power supply and the output of the ring counter. The adder AD is provided for the purpose of adding the output voltages of these six flip-flops to each other. Symbol DF shows a differential amplifier for producing an output voltage representing the difference between the predetermined phase value applied to the terminal PH and the output of the adder AD. The output of the differential amplifier DF is smoothed by the filter FL, amplified by the DC amplifier A and applied to the voltage-controlled oscillator VCO which oscillates at a frequency proportional to the intput voltage thereto. The output of the voltage-controlled oscillator VCO is applied to the ring counter RC. This ring counter RC comprises flip-flops $RC_1$ to $RC_6$ to the reset terminals R of which the output of voltage-controlled oscillator VCO is applied, while each of the set terminals S thereof is impressed with output variations of an immediately adjacent one of the flip-flops $RC_1$ to $RC_6$, only one of the six flip-flops being always maintained in a "1" state. Each time a pulse arrives from the voltage-controlled oscillator VCO, the "1" state moves from flip-flops $RC_1$ to $RC_6$ in that order. Reference symbols $FO_1$ to $FO_6$ shows flip-flops having set terminals S and reset terminals RS respectively. The flip-flop $FO_1$ is set by the output of the flip-flop $RC_1$ and reset by the output of the flip-flop $RC_4$; the flip-flop $FO_2$ is set by the output of the flip-flop $RC_2$ and reset by the output of the flip-flop $RC_5$; and so on.

The outputs of the flip-flops $FO_1$ to $FO_6$ are applied to corresponding integrating circuits $I_1$ to $I_6$ having the same suffix in FIG. 2 respectively.

The operating principle of the circuit of FIG. 4 will be now explained. The average output value of the adder AD is proportional to the phase difference between the outputs of the synchronous power supply and the ring counter RC, a predetermined value of the phase difference being applied to the terminal PH. If the output of the ring counter lags the output of the synchronous power supply in the phases thereof more than the predetermined value, then the output of the adder AD is larger than the voltage of the terminal PH, so that the output of the DC amplifier A and the frequency of the voltage-controlled oscillator VCO are increased thereby to reduce the phase difference. In the event that the output of the ring counter RC lags the synchronous power supply by less than the predetermined value, by contrast, the frequency of the voltage-controlled oscillator VCO is reduced, causing a phase delay. As a result, the phase difference is settled down at the predetermined value applied to the terminal PH. When the frequency of the power supply changes, the output of the ring counter is gradually placed out of synchronism with the synchronous power supply in phase if the frequency of the voltage-controlled oscillator VCO is fixed, with the result that the frequency of the voltage-controlled oscillator VCO is changed for the same reason as in the preceding case thereby to maintain the same phase relationship as prior to the frequency change. If the predetermined phase difference is 60°, for example, the output of the flip-flop $RC_2$ is 60° behind the output of the waveform converter circuit $F_1$, so that the output of the flip-flop $RC_1$ 60° in advance of the output of the flip-flop $RC_2$ is in phase with the output of the waveform convertor circuit $F_1$. Since the flip-flop $FO_1$ is set by the flip-flop $RC_1$ and reset by the flip-flop $RC_4$, the flip-flop $FO_1$ has the output width of 180° like the waveform convertor circuit $F_1$ and therefore its output is in phase with the output of the waveform convertor circuit $F_1$. In like manner, if the synchronous power supply is balanced, the outputs of the waveform convertor circuits $F_1$ to $F_6$ are in phase with and have the same waveforms as the outputs of the flip-flops $FO_1$ to $FO_6$ respectively. When the synchronous power supply is unbalanced, on the other hand, in spite of the fact that the widths of the outputs of flip-flops $FF_1$ to $FF_6$ are different, they are smoothed by the filter FL thereby to make the oscillator VCO continue a stable oscillation, so that the outputs of the $RC_1$ to $RC_6$ and hence those of the flip-flops $FO_1$ to $FO_6$ are produced at exactly 60° intervals.

It will be noted from the above description that according to the present invention not only the pulse phase changes very quickly in response to the controlled voltage Ec as in the circuit of FIG. 2, but also pulses with 60° intervals are accurately generated even when the AC voltage is unbalanced, thus making possible a pulse phase shifter capable of preventing the generation of abnormal higher harmonics.

Although the embodiment of FIG. 4 is concerned with a 6-phase pulse phase shifter, the present invention can be also easily applied to pulse-phase shifters of 12 or more phases.

In the embodiment of FIG. 4 for the reason that the pulse phase shifting section 2 employs comprises six-pulse phase shifters, it is impossible to obtain pulses of exactly equal intervals if there are relative errors between the characteristics of the 6 pulse phase shifters.

Figure 5:
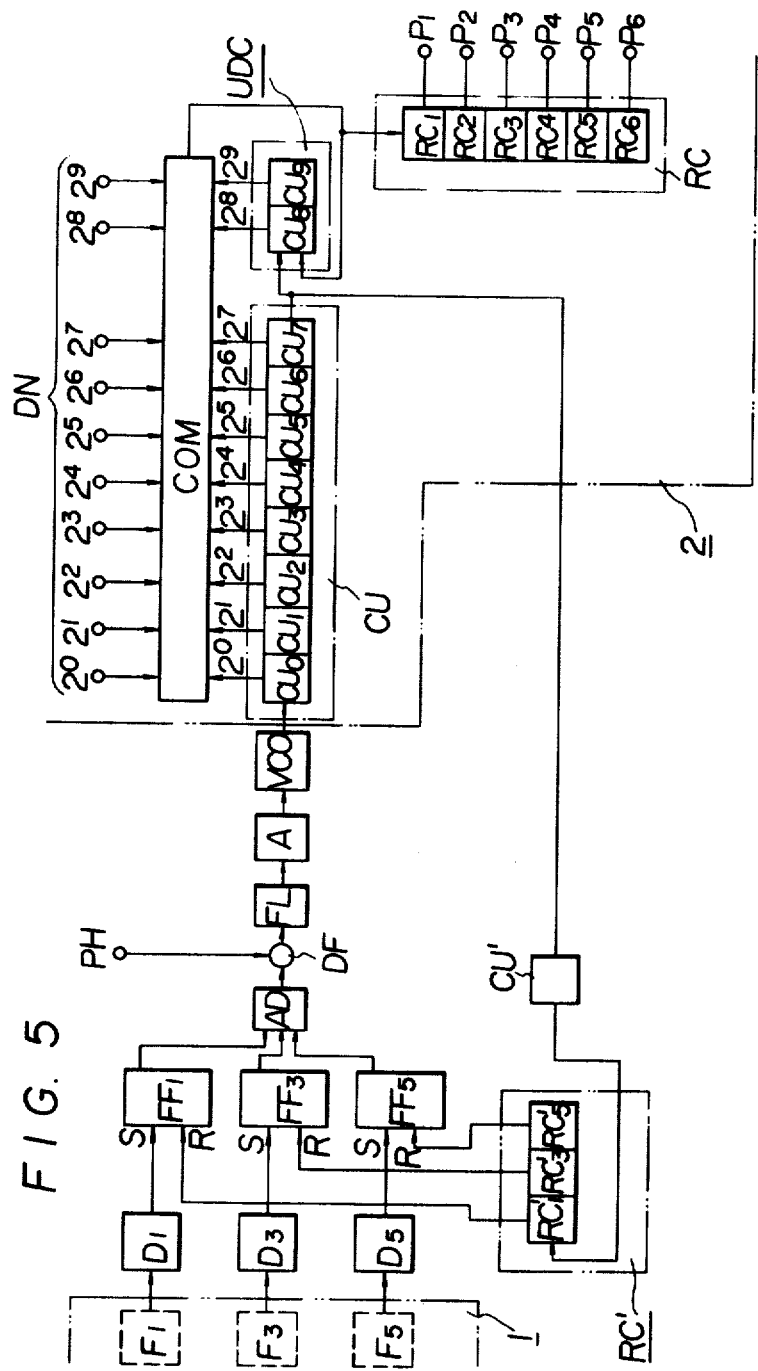
FIG. 5 shows a second embodiment of the invention.

This disadvantage is obviated by the embodiment shown in FIG. 5. This embodiment includes a digitized pulse phase shifting section 2, so that the use of a circuit adapted to be switched among various phases enables the errors between the phases to be completely eliminated. Also, a phase-locked oscillator interposed between the synchronous power supply 1 and pulse phase shifting section 2 for generating synchronizing pulses of equal intervals is used to change the frequency of clock pulses of the counter in proportion to the AC power supply (synchronous power supply) in such a manner that pulses of predetermined electrical angle are always produced even if the frequency of the AC power supply undergoes a change. The operating principle of the embodiment under consideration will be explained in detail below.

The embodiment of FIG. 5 from which the waveform convertor circuits $F_2$, $F_4$ and $F_6$ are omitted for simplification of illustration may include the same arrangement as in the circuit of FIG. 4. Also, the synchronous power supply 1 may comprise only the waveform convertor circuit $F_1$ in such a manner as to apply a synchronizing signal to the phase-locked oscillator once in a cycle. By doing so, not only the synchronous power supply 1 but the input section of the voltage-controlled oscillator can be simplified to a large measure. The simplification of the synchronous power supply, on the other hand, requires the time constant of the filter FL to be increased. This requirement, however, provides no roadblock to the achievement of the object of the invention to generate firing pulses of equal intervals. Further, the delay of response of the phase-locked oscillator which may result from the increased time constant of the filter FL does not substantially adversely affect the characteristics of the device.

In FIG. 5 showing a 3-phase full-wave bridge circuit as in FIG. 4, reference symbol CU shows an 8-bit binary counter, and symbol CU' a 1-bit binary counter. Symbol UDC shows what is called an up-down counter which is such a 2-bit binary counter that the stored number is increased by one each time of application thereto of an overflow pulse from the counter CU, while it is decreased by one each time of arrival of an output pulse from the comparator COM of which description will be made later. The comparator COM compares the 10-bit binary number comprising the outputs from the counter CU and up-down counter UDC with the binary number DNN applied to the pulse phase determination terminal DN and, if the former is larger than the latter, produces an output. Symbol RC' shows a 3-bit ring counter.

Differing from the circuit of FIG. 4 where 6 flip-flops $FF_1$ to $FF_6$ for detecting the phase difference are involved as mentioned earlier, the embodiment under consideration includes only 3 flip-flops for such a purpose. This is because their sole purpose is to detect the phase difference between the AC power supply and the output of the oscillator, the minimum requirement being a single flip-flop. However, the fewer the flip-flops are, the ripple of the input to the voltage-controlled oscillator becomes larger, making it necessary to increase the time constant of the filter FL. In view of the provision of three flip-flops, three corresponding differentiating circuits $D_1$, $D_3$ and $D_5$ are provided accordingly and receive outputs of the waveform convertor circuits $F_1$, $F_3$ and $F_5$ of FIG. 2 respectively. The flip-flops $FF_1$, $FF_3$ and $FF_5$ are set by the outputs of the differentiating circuits $D_1$, $D_3$ and $D_5$ respectively and reset by the outputs of the flip-flops $RC_1'$, $RC_3'$ and $RC_5'$ respectively.

Figure 6:
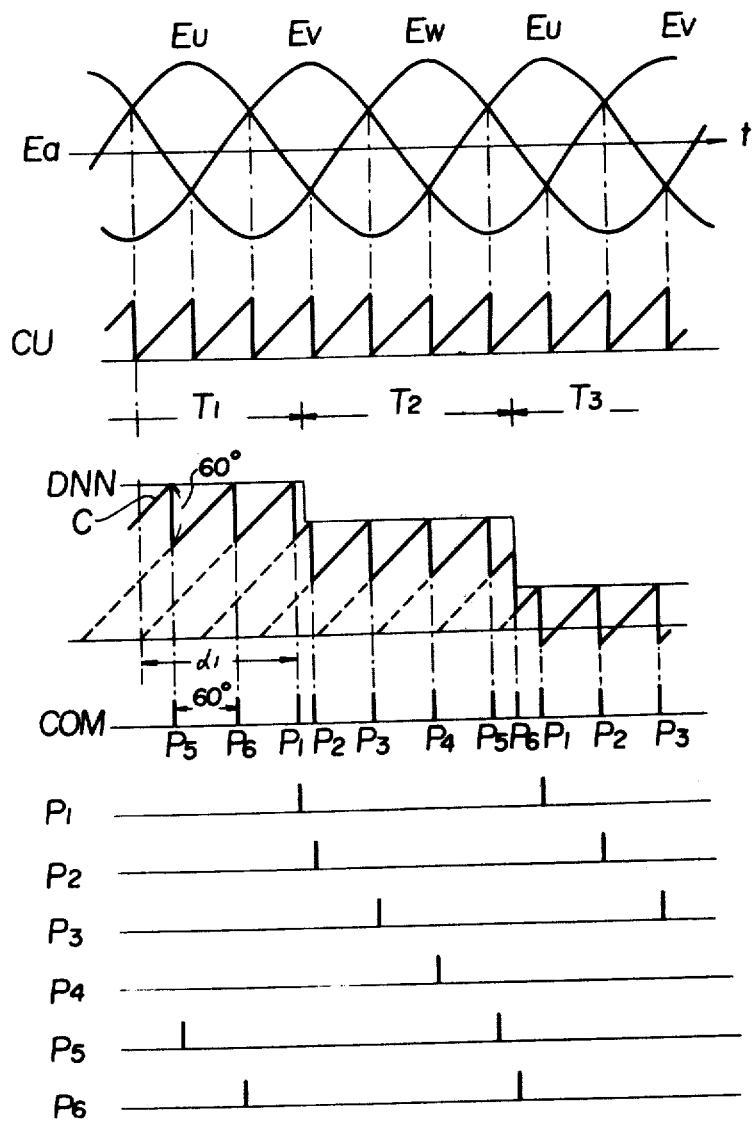
FIG. 6 is a diagram for explaining the operation of the embodiment of FIG. 5.

Assuming that the output frequency of the counter CU' is $3f_0$ or three times the frequency $f_0$ of the AC power supply, each of the bit outputs of the ring counter elements $RC_1'$, $RC_3'$ and $RC_5'$ is produced in sequence once in a cycle of the AC power supply. If this is to be realized, the variations of the output frequency of the voltage-controlled oscillator should be made around the center of $2^9 \times 3f_0$. In other words, when the output of the differential amplifier DF should be the predetermined value, that is, the output frequency of the voltage-controlled oscillator is $2^9 \times 3f_0$. Since this embodiment has the same control loop as the device of FIG. 1, the operation of the oscillator is such that the phase relation of the outputs of the flip-flops $RC_1'$, $RC_3'$ and $RC_5'$ with the power supply is determined by the voltage applied to the terminal PH. The counter CU produces an output frequency twice the frequency of the output of the counter CU', that is to say, it has the frequency of $6f_0$ and operates exactly at 60°. Also, the time point when the counter CU overflows and returns to zero can be made to agree with the point where the AC voltage is zero. If left as they are, the counters CU and UDC in cascade continue their counting operations at the cycle of 240° ($2^2 \times 60°$). When the number counted exceeds the number DNN applied to the terminal DN, however, the digital comparator COM generates a pulse whereby the number counted by the counter UDC is reduced by one count. Since this one count corresponds to 60°, the counters CU and UDC in cascade return by 60° to continue the counting operation. Thus, if the number DNN applied to the terminal DN is constant, pulses exactly with 60° intervals are obtained as the output of the comparator COM. This output is distributed in six phases by the sixbit ring counter RC thereby to produce firing pulses $P_1$ to $P_6$. The above-mentioned operation is illustrated in FIG. 6. In this drawing, symbol Ea shows phase voltages Eu, Ev and Ew of the 3-phase power supply, and symbol CU counts made by the counter CU as expressed in the ordinate. It was already explained that the time point when the counter over-flows and returns to zero is made to agree with the zero point of the AC line voltage by adjusting the voltage applied to terminal PH. The waveform shown by C represents the number of counts made by the counters CU and UDC of cascade connection in the ordinate. When this number exceeds the number DNN applied to the phase determination terminal DN, the comparator COM produces a pulse whereupon the number of counts made by the counters is reduced by a number corresponding to 60°. The counters continue the counting operation, and when the number DNN is exceeded again, a pulse is generated. The diagram of FIG. 6 shows a case in which the number DNN is different for each of the time periods $T_1$, $T_2$ and $T_3$, symbol $\alpha_1$ showing the control angle corresponding to the number DNN for period $T_1$. By distributing the output of the comparator COM into six pulses by the ring counter, firing pulses $P_1$ to $P_6$ for the respective arms of the thyristor bridge are obtained.

In the circuit of FIG. 5, one count of the counter CU represents $60°/2^8 = 0.234°$, thus making possible highly accurate phase control. This accuracy of phase control can be further increased by increasing the frequency of the voltage-controlled oscillator VCO and the number of bits of counter CU. Also the cost of the device may be lowered, as desired, by decreasing the frequency of the voltage-controlled oscillator VCO and the number of bits of the counter CU. Further, this circuit produces pulses at exactly regular intervals of 60° if the number DNN applied to the terminal DN is fixed. Accordingly, not only abnormal higher harmonics are restrained as in the circuit of FIG. 4 but high responsiveness of the phase shifter is achieved simply by changing the predetermined value of DNN applied to the terminal DN. Furthermore, the outputs of the voltage-controlled oscillator VCO which function as clock pulses for the counter CU are always maintained in synchronism with the AC power supply, and therefore their frequency changes in proportion to the frequency of the AC power supply.

As a result, by maintaining the predetermined value DNN fixed, firing pulses of the same electrical angle are obtained regardless of frequency variations of the AC power supply.

In spite of the above-mentioned superior characteristics of the circuit shown in FIG. 5, the use of the ring counter for distributing output pulses $P_1$ to $P_6$ undesirably sustains any pulse displacements from a set position which may be caused by noises. Even though it is possible to manage to eliminate the noise effect, the fact remains that such a noise effect is a disadvantage of the circuit of FIG. 5.

Figure 7:
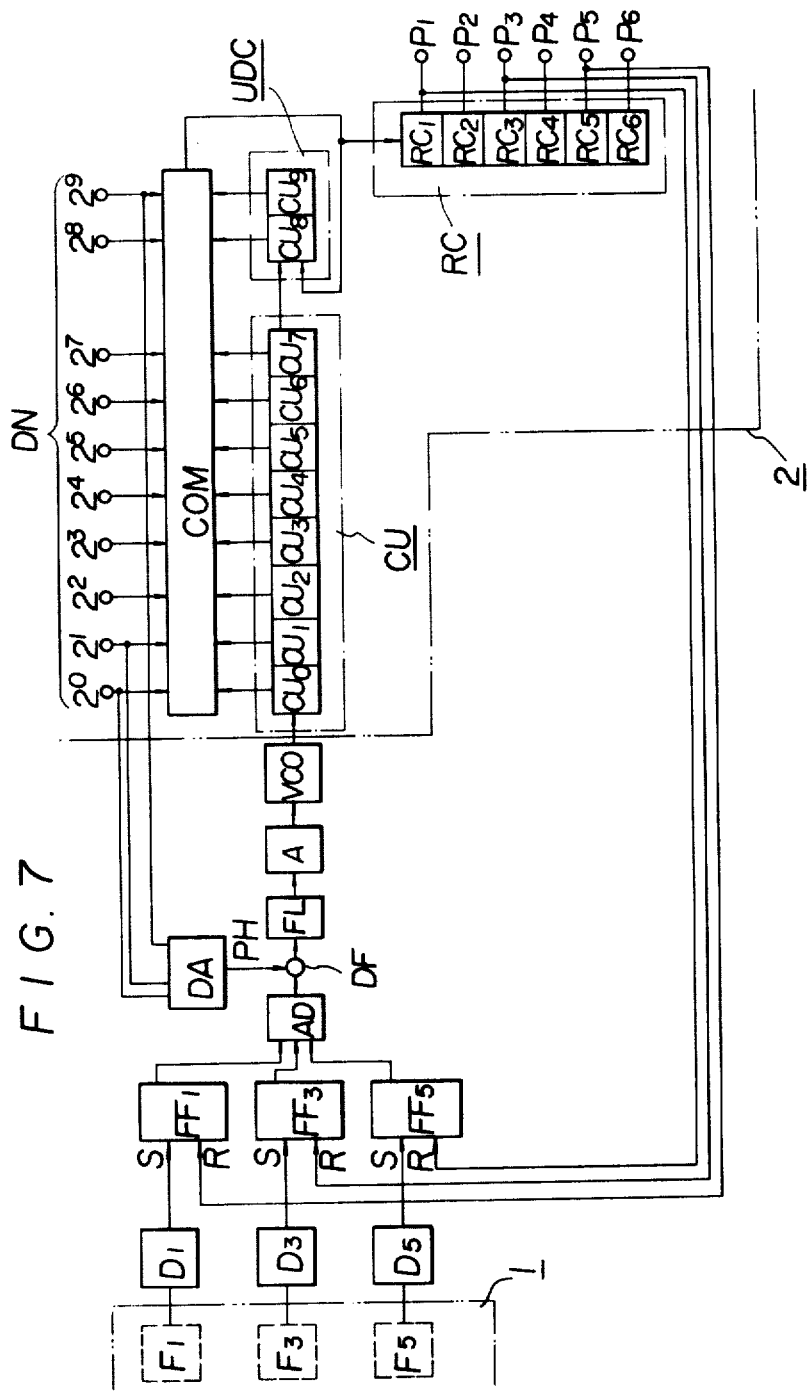
FIG. 7 shows a third embodiment of the invention.

Another embodiment to obviate the abovementioned disadvantage is shown in FIG. 7. This circuit is different from the circuit of FIG. 5 in that in this circuit the outputs of the ring counters $RC_1$, $RC_3$ and $RC_5$ are used to reset the flip-flops $FF_1$, $FF_3$ and $FF_5$ for detecting the phase difference and that the pulses applied to the terminal PH are replaced by those pulses which are the result of the conversion of the binary number applied to the pulse phase determination terminal DN into an analog voltage by means of the digital-analog convertor DA.

This circuit is so controlled that pulse $P_1$, for example, lags the signal $F_1$ by an amount corresponding to the predetermined pulse phase applied to the terminal DN. Like the operation of the circuit of FIG. 4 with the delay of $P_1$ phase, the frequency of voltage-controlled oscillator is increased thereby to advance the phase, while the advancing of the phase of pulse $P_1$ causes the frequency of the voltage-controlled oscillator VOC to be decreased thereby to delay the phase. When the phase applied to the terminal DN undergoes a sudden change, the phases of the output pulses $P_1$ to $P_6$ also change suddenly by the operation mentioned with reference to the circuit of FIG. 6. At the same time, the output of the DA convertor changes suddenly, with the result that the output of the differential amplifier DF returns to the original value within a very short period of time. The time constant of the filter FL in this circuit is determined so great and during this period the output frequency of the voltage-controlled oscillator remains unchanged at the original value. It will thus be understood that a high response is also assured in this circuit for high-speed control as in the circuit of FIG. 4 or 5. The phase of pulses $P_1$ is so controlled as to maintain a predetermined relationship with the phase of the signal $F_1$ and therefore any pulse phase displacement, which may occur by an erroneous operation, is not sustained.

Brief explanation will be made now of the reason why in the embodiment of FIG. 7, unlike the circuits of FIGS. 4 and 5, the phase determination signal PH is not fixed. In the embodiments of FIGS. 4 and 5, the phase difference detected by the flip-flops $FF_1$ to $FF_6$ is the result of the distribution of the outputs of the synchronous power supply and the voltage-controlled oscillator, and therefore it is safely said that is suffices if the phase of the output of the voltage-controlled oscillator VCO is controlled so that the phase of signal PH may be fixed. By contrast, the circuit of FIG. 7 is such that the flip-flops $FF_1$, $FF_3$ and $FF_5$ directly detect the phase difference between the synchronous power supply and the firing pulses. In view of the object of the invention to control the phase difference while maintaining regular pulse intervals, the fact that the phase difference to be controlled is detected directly by the flip-flops $FF_1$, $FF_3$ and $FF_5$ makes it necessary to control the phase of the output of the voltage-controlled oscillator VCO accordingly. For this reason, the signal PH is changed at the same time the phase signal of the terminal DN is changed.

Figure 8:
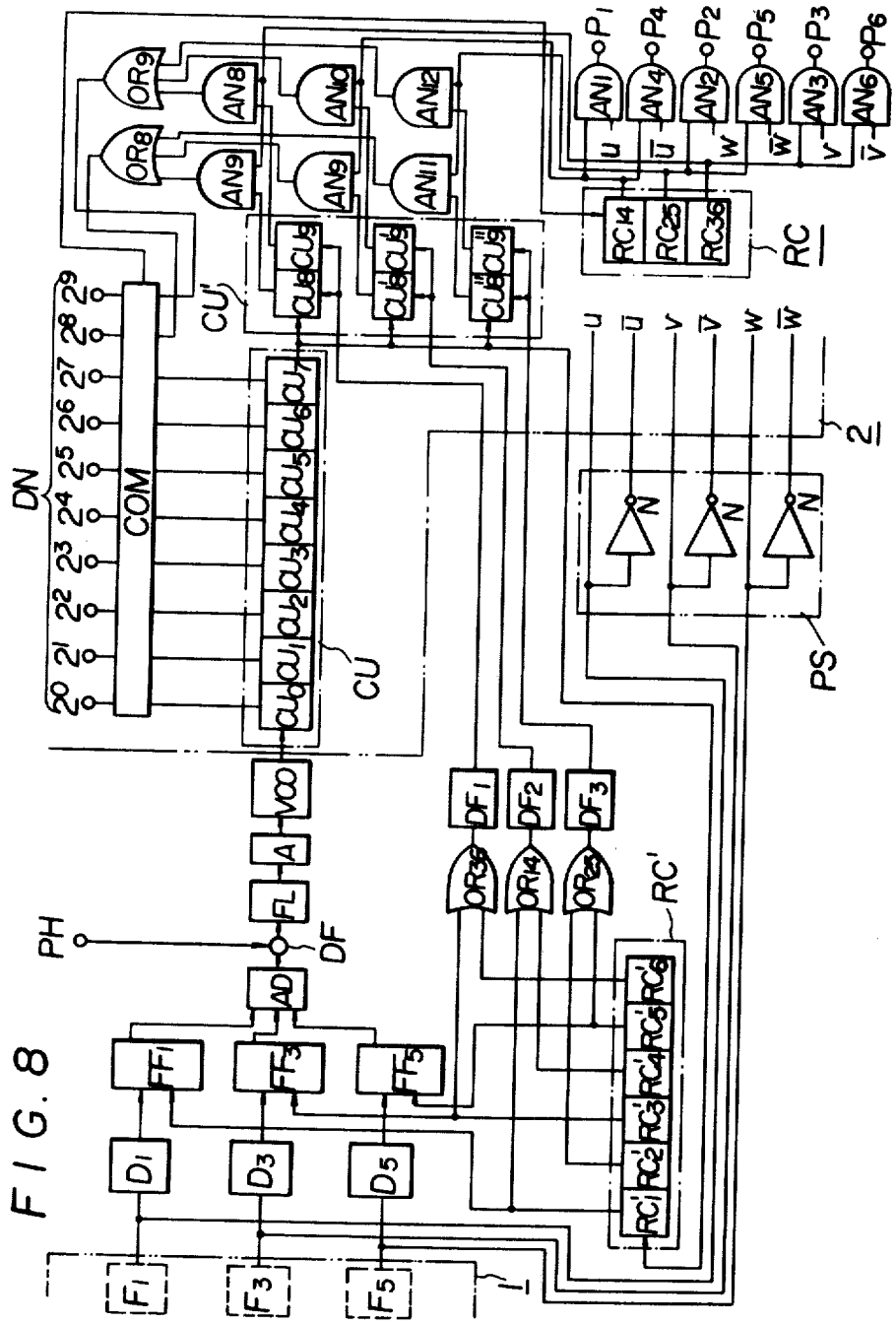
FIG. 8 is a diagram showing a fourth embodiment of the invention.

Still another embodiment intended to obviate the shortcoming of the circuit of FIG. 5 is illustrated in FIG. 8. In this circuit, as in the circuit of FIG. 5, the center frequency of the output of the counter CU is six times the frequency of the AC power supply or $6f_0$. By the same control operation as explained with reference to FIG. 4, the output of the first-bit $RC_1'$ of the ring counter RC' is set at a phase 60° behind the signal $F_1$, so that the rise time of signal $F_1$ coincides with that of the output of the counter $RC_6'$. Counter CU' includes three 2-bit counters, each of which counts the overflow output of the counter CU but is reset by a signal from the ring counter RC' representing different orders of digits. Symbols $OR_{14}$, $OR_{25}$ and $OR_{36}$ show OR circuits, each of which produces a 1 signal when one of the signals applied thereto is 1. Symbols $DF_1$ to $DF_3$ show differentiation circuits. The counters $CU_8$ and $CU_9$ are reset by rise pulses from counters $RC_3'$ and $RC_6'$; counters $CU_8'$ and $CU_9'$ by those from the counters $RC_1'$ and $RC_4'$; and counters $CU_8''$ and $CU_9''$ by those from counters $RC_2'$ and $RC_5'$. The number of counts made by the counters CU, $CU_8$ and $CU_9$ in cascade is represented by waveform $C_1$ in FIG. 9. Similarly, the waveform $C_2$ is given by the combination CU, $CU_8'$ and $CU_9'$ and the waveform $C_3$ by the combination CU, $CU_8''$ and $CU_9''$.

Figure 9:
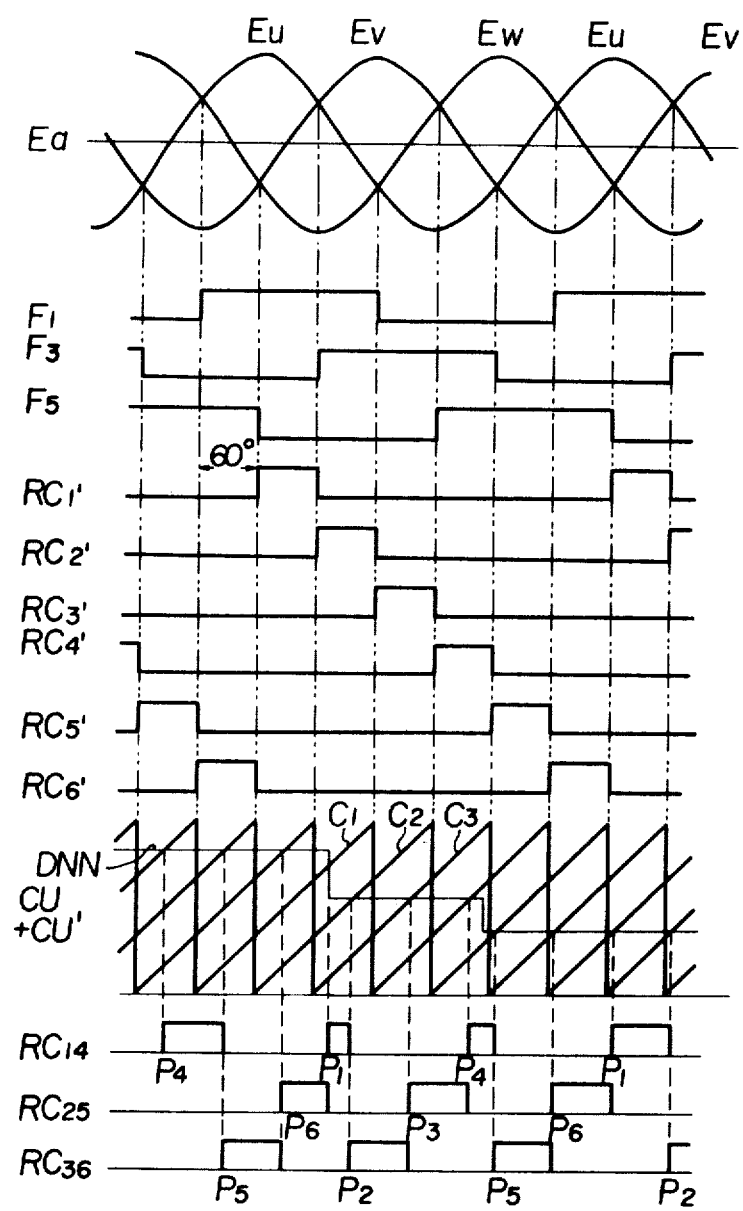
FIG. 9 is a diagram for explaining the operation of the fourth embodiment shown in FIG. 8.

The digital comparator COM, like the circuit of FIG. 5, produces a pulse when the number of counts made by the counters CU and CU' exceeds the predetermined phase value DNN applied to the terminal DN. Among the inputs to the comparator COM, those representing the 9th and 10th bits that is $2^8$ and $2^9$ are impressed with selected ones of the outputs from the three counter elements of CU', while the output from the comparator COM is divided into three by the 3-bit ring counter RC, thereby producing three pulses $RC_{14}$, $RC_{25}$ and $RC_{36}$ as shown in FIG. 9. The outputs of the three counters of CU' are applied selectively to the digital comparator COM through the OR circuits $OR_8$ and $OR_9$ and the AND circuits $AN_7$ to $AN_{12}$. The AND circuits AN are so constructed as to produce a 1 signal only when both of the two inputs thereto are 1. Assuming that $RC_{36}$ is a 1 pulse, both of the pulses $RC_{14}$ and $RC_{25}$ are 0 and therefore both of the outputs of the AND gates $AN_9$ to $AN_{12}$ are 0. As a result, the counts by the counters $CU_8$ and $CU_9$ are applied to the comparator COM. In other words, $C_1$ and DNN in FIG. 9 are compared with each other. When $C_1$ exceeds the predetermined value DNN, the comparator COM generates a pulse, so that the ring counter changes its state by one whereby signal $RC_{14}$ becomes 1. In this way, signals $RC_{14}$ and $RC_{36}$ are changed to 1 by comparison between $C_1$ and DNN and between $C_3$ and DNN respectively,, with the result that pulses $RC_{14}$, $RC_{25}$ and $RC_{36}$ equivalent to the combinations $P_1$ and $P_4$; $P_2$ and $P_5$; and $P_3$ and $P_6$ are produced. The circuit shown by symbol PS and AND gates $AN_1$ to $AN_6$ in FIG. 8 are provided for the purpose of distributing the output of the ring counter RC among the combinations $P_1$ and $P_4$; $P_2$ and $P_5$; and $P_3$ and $P_6$. Circuit elements N included in the circuit PS are for reversing the polarity of input pulses.

The outputs $u$, $\bar{u}$, $v$, $\bar{v}$, $w$, and $\bar{w}$ of the circuit PS are connected to the input terminals indicated by like symbols of the AND gates $AN_1$ to $AN_6$, while it receives inputs $F_1$, $F_3$ and $F_5$ as the differentiating circuits $D_1$, $D_3$ and $D_5$ do. In the circuit diagram of FIG. 9, let us assume that an output of AND gate $AN_1$ that is an output of $RC_{14}$ which is generated or rises during the 1 state of $F_1$ is defined as $P_1$, and that an output of AND gate $AN_4$ which is generated or rises during the 0 state of signal $F_1$ or 1 state of signal $\bar{u}$ as $P_4$, and so on. The resulting signals $P_1$ to $P_6$ are shown in FIG. 2.

It will be noted from the above description that the circuit of FIG. 8 completely divides pulses from the comparator COM into $P_1$ to $P_6$. This circuit, though complicated compared with the circuit of FIG. 7, has the advantage that each component element of the device can be inspected separately as the phase of output of the counter CU is determined within a closed loop including the voltage-controlled oscillator regardless of the predetermined value DNN. Further, in the embodiment of FIG. 8, in spite of the fact that noises may cause the ring counter RC to make an erroneous count, the firing pulses are not subjected to a sustained phase displacement as in the circuit of FIG. 5. The reason for such an advantage will be explained with reference to FIG. 9. Assume that when $RC_{36}$ is 1 and signal $C_1$ is to be compared with signal DNN, noises are applied to the ring counter RC thereby to reduce the $RC_{36}$ to zero while changing signal $RC_{14}$ to 1 state. Counters $CU_8'$ and $CU_9'$ instead of counters $CU_8$ and $CU_9$ are used, so that the signal DNN is compared with the signal $C_2$, thus jumping from the characteristics of $C_1$ to those of $C_2$. This results in the loss of either firing pulse $P_1$ or $P_4$ which is to be produced by comparison between $C_1$ and DNN. However, the fact that the relation between counter CU' and AND gates $AN_1$ to $AN_6$ is maintained as before permits accurate generation of the next firing pulse. As mentioned above, let alone the disadvantage that noises inevitably cause one of the firing pulses to be lost, the problem posed by the embodiment of FIG. 5 is overcome. Although the total loss of firing pulses result in commutation failure in the inverter operation and reduced output voltage in rectifier operation, loss of only one firing pulse gives rise to no substantial adverse effect on the actual operation of such devices.

To summarize, according to the present invention, firing pulses are obtained by distributing an output signal of an oscillator and therefore they are produced at exactly regular intervals even in the case of phase displacement, thus preventing the undesirable generation of higher harmonics without fail.

The digital comparator COM used in the embodiments of FIGS. 5, 7 and 8 may be replaced by an arrangement in which the counter output is converted into an analog voltage by a DA converter and the predetermined phase value is given in the form of an analog voltage.

Also, in phase of the counter CU' and ring counter RC' used in the circuits of FIGS. 5 and 7 to generate reset pulses for flip-flops, the 6-bit ring counter RC' as used in the circuit of FIG. 8 may be employed.

What is claimed is:

1. An automatic pulse phase shifter comprising:
an oscillator for producing an oscillation frequency in accordance with an input voltage applied thereto;
first means for dividing the oscillation frequency of said oscillator by a prescribed value and producing an output representative thereof;
second means, coupled to receive an A.C. voltage and the output of said first means, for producing an output representative of the phase difference between said A.C. voltage and the output of said first means;

third means for converting the output of said third means into a voltage to be applied to said oscillator in accordance with a signal applied thereto for maintaining a prescribed phase difference between the output of said oscillator and said A.C. voltage; and fourth means for producing firing pulses in accordance with the output of said first means and a control signal for regulating the phase at which said firing pulses are required to be produced.

2. An automatic pulse phase shifter according to claim 1, wherein said first means includes a first counter circuit receiving the output of said oscillator and generating a first digital signal representative thereof; and wherein said fourth means comprises a comparator for comparing said first digital signal with a digital control signal, for regulating the phase at which said firing pulses are required to be produced in accordance with the comparison output thereof.

3. An automatic pulse phase shifter according to claim 2, wherein that part of said counter circuit for generating said first digital signal to be compared with said digital control signal which is not included the part of said counter circuit functioning as a counter for said first means is provided for each phase of said A.C. voltage, and wherein said fourth means further includes means for designating the phase in which firing pulses are produced in response to the polarity of each phase of said A.C. voltage.

4. An automatic pulse phase shifter comprising:
an oscillator for producing an oscillation frequency in accordance with an input voltage applied thereto;
a first counter, coupled to said oscillator, and having a prescribed count capacity, for providing a first digital signal representative of the count of said oscillation frequency;
a second counter, coupled to said first counter, for producing a second digital signal representative of the overflow of said first counter and for increasing its own count for each overflow bit from said first counter;
first means for providing a third digital signal in accordance with the phase at which firing pulses are to be generated;
second means, coupled to said first means and to said first and second counters, for producing an output pulse when said third digital signal is exceeded by the outputs of said first and second counters;
third means for coupling the output of said second means to said second counter for decreasing its count by one bit for each output pulse from said second means;
fourth means, having a plurality of dividing stages, for dividing the output of said second means by a prescribed amount, and providing a firing pulse from each respective dividing stage thereof;
fifth means, receiving an A.C. voltage and the output of said fourth means, for producing an output signal representative of the phase difference therebetween; and
sixth means, coupled to said first means and said fifth means, for determining the difference between a voltage representative of said third digital signal and the output of said fifth means, and for controlling the output of said oscillator in accordance therewith.

5. An automatic pulse phase shifter comprising:
an oscillator for producing an oscillation frequency in accordance with an input voltage applied thereto;
a first counter, coupled to said oscillator, and having a prescribed count capacity, for providing a first digital signal representative of the count of said oscillation frequency;
a plurality of second counters, each of which is coupled to said first counter, for producing a second digital signal representative of the overflow of said first counter and for increasing its own count each overflow bit from said first counter;
first means for providing a third digital signal for regulating the phase at which firing pulses are required to be produced;
second means, coupled to said first means and to said first and second counters, for producing an output pulse when said third digital signal is exceeded by the outputs of said first and second counters;
third means, having a plurality of dividing stages, for dividing the output of said second means by a prescribed amount, and providing a firing pulse from each respective dividing stage thereof;
fourth means, having a plurality of dividing stages, for dividing the putput of said first counter by a prescribed amount;
fifth means, coupled to selected dividing stages of said fourth means and coupled to receive an A.C. voltage, for generating an output signal representative of the phase difference therebetween;
sixth means, coupled to prescribed dividing stages of said fourth means for selectively resetting said plurality of second counters;
seventh means, selectively coupled to the dividing stages of said third means, for selectively gating the outputs of said second counters to said first means, and
eight means, coupled to said fifth means and coupled to receive a phase determination signal, for controlling the output of said oscillator in accordance with the difference therebetween.

* * * * *